(12) United States Patent
Tang

(10) Patent No.: US 7,784,752 B2
(45) Date of Patent: Aug. 31, 2010

(54) ELECTRONIC DEVICE WITH SUPPORT LEGS

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/192,086

(22) Filed: Aug. 14, 2008

(65) Prior Publication Data

US 2009/0266947 A1     Oct. 29, 2009

(30) Foreign Application Priority Data

Apr. 28, 2008   (CN) .......................... 200810301341

(51) Int. Cl.
  *A47B 91/00*   (2006.01)
(52) U.S. Cl. ................. 248/188.8; 248/188.2; 248/677; 361/679.26; 400/691
(58) Field of Classification Search ............. 248/188.1, 248/188.2, 188.3, 188.8, 188.91, 677, 688, 248/351, 460, 462, 463, 459, 155.1, 543; 361/679.26; 400/691, 472
See application file for complete search history.

(56) References Cited

U.S. PATENT DOCUMENTS

| | | | |
|---|---|---|---|
| 1,568,425 A * | 1/1926 | Smith | 248/451 |
| 1,892,014 A * | 12/1932 | Singer et al. | 40/748 |
| 2,432,266 A * | 12/1947 | Wilkinson | 248/188.6 |
| 2,817,567 A * | 12/1957 | Shepherdson | 108/132 |
| 2,828,098 A * | 3/1958 | Lehmann | 248/292.13 |
| 3,185,233 A * | 5/1965 | Provi | 177/239 |
| 3,734,364 A * | 5/1973 | Mayer | 223/116 |
| 4,022,414 A * | 5/1977 | Egger | 248/150 |
| 4,421,035 A * | 12/1983 | Gubbe et al. | 108/6 |
| 4,592,528 A * | 6/1986 | Still | 248/682 |
| 4,693,444 A * | 9/1987 | Williams et al. | 248/653 |
| 4,944,481 A * | 7/1990 | Yurchenco et al. | 248/372.1 |
| 5,671,901 A * | 9/1997 | Jacober | 248/452 |
| 6,678,153 B2 * | 1/2004 | Chen et al. | 361/679.21 |
| 6,695,273 B2 * | 2/2004 | Iguchi | 248/351 |
| 7,299,580 B2 * | 11/2007 | Wang et al. | 40/719 |
| 2002/0088918 A1 * | 7/2002 | Uto et al. | 248/688 |
| 2003/0025063 A1 * | 2/2003 | Chen et al. | 248/918 |
| 2004/0011937 A1 * | 1/2004 | Iguchi | 248/351 |
| 2005/0253040 A1 * | 11/2005 | Yang | 248/688 |

\* cited by examiner

*Primary Examiner*—Kimberly T Wood
(74) *Attorney, Agent, or Firm*—Zhigang Ma

(57) ABSTRACT

An exemplary electronic device (30) includes a main body (40) and two supporting mechanisms (60). The supporting mechanisms are formed at two adjacent corners of the main body respectively. Each supporting mechanism includes a support leg (62), a positioning leg (64), and an elastic member (65). The support leg is rotatably connected to the main body, and configured for supporting the main body. The positioning leg is rotatably connected to the support leg, and configured for supporting the support leg. The elastic member is resisted between the support leg and the positioning leg, thus producing an elastic force to drive the positioning leg away from the support leg.

17 Claims, 8 Drawing Sheets

ELECTRONIC DEVICE WITH SUPPORT LEGS

BACKGROUND OF THE INVENTION

1. Field of the Invention

The present invention generally relates to electronic devices, particularly to an electronic device with a main body and a rotatable display body.

2. Discussion of the Related Art

A notebook computer mainly includes a main body with a keyboard and a display body. The display body is rotatably attached to the main body in order that the display body can be opened and closed relative to the main body. In use, the main body is generally disposed on a desktop. However, an angle between the main body and the desktop is normally 0 degree. Thereby, the keyboard is uncomfortable for a user to operate, and the user easily feels tired after long time of using the notebook. In addition, when the notebook computer is laid on the desktop, the main body of the notebook computer touches the desktop fully. Therefore, heat produced by internal electronic components cannot be dispersed efficiently from the main body of the notebook, even though the notebook has a fan for heat dissipation. As a result, the internal electronic components may be damaged due to overheating. Accordingly, a notebook computer which can solve the above-described problems is needed.

Referring to FIG. 8, a typical notebook computer 10 includes a main body 11 and a display body 12. The main body 11 defines a first groove 113 for receiving a keyboard 112. One end of the keyboard 112 is rotatably connected to a sidewall defining the first groove 113. A bottom wall in the first groove 113 further defines a second groove 115 for receiving an elastic member 114. One end of the elastic member 114 is rotatably connected to a sidewall of the second groove 115. In use, the keyboard 112 is rotated a desired angle relative to the main body 11, and is supported by the elastic member 114. Therefore, the keyboard 112 is slanted relative to the main body 11. As a result, a user may feel comfortable to operate on the keyboard 112. Furthermore, a gap for emitting heat is formed between the keyboard 112 and the main body 11.

However, a gap for emitting heat is formed between the keyboard 112 and the main body 11, thus dust could easily get inside of the main body 11 and deposits on the internal electronic components of the main body 11. Therefore, a short circuit of the internal electronic components may occur, and it is not easy to disperse heat produced by the internal electronic components from inside of the main body 11.

Therefore, an electronic device which overcomes the above-described shortcomings is desired.

SUMMARY

An exemplary electronic device includes a main body and two supporting mechanisms. The supporting mechanisms are formed at two adjacent corners of the main body respectively. Each supporting mechanism includes a support leg, a positioning leg, and an elastic member. The support leg is rotatably connected to the main body, and configured for supporting the main body. The positioning leg is rotatably connected to the support leg, and configured for supporting the support leg. The elastic member is resisted between the support leg and the positioning leg, thus producing an elastic force to drive the positioning leg away from the support leg.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION OF THE EMBODIMENTS

References will now be made to the drawings to describe embodiments of the present electronic device, in detail.

Figure 1:
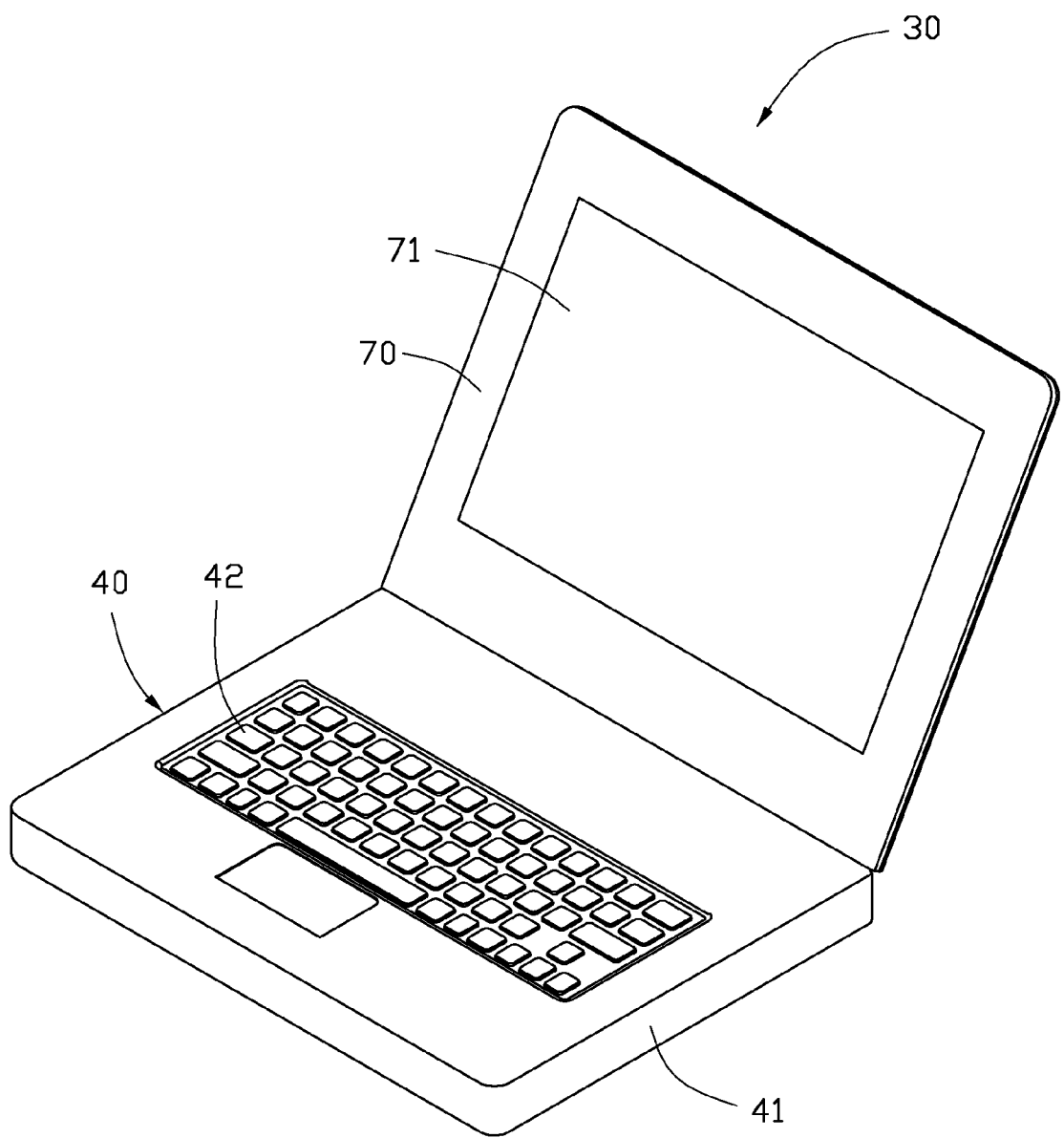
FIG. 1 is an schematic, isometric view of a notebook computer of the present application.
Figure 2:
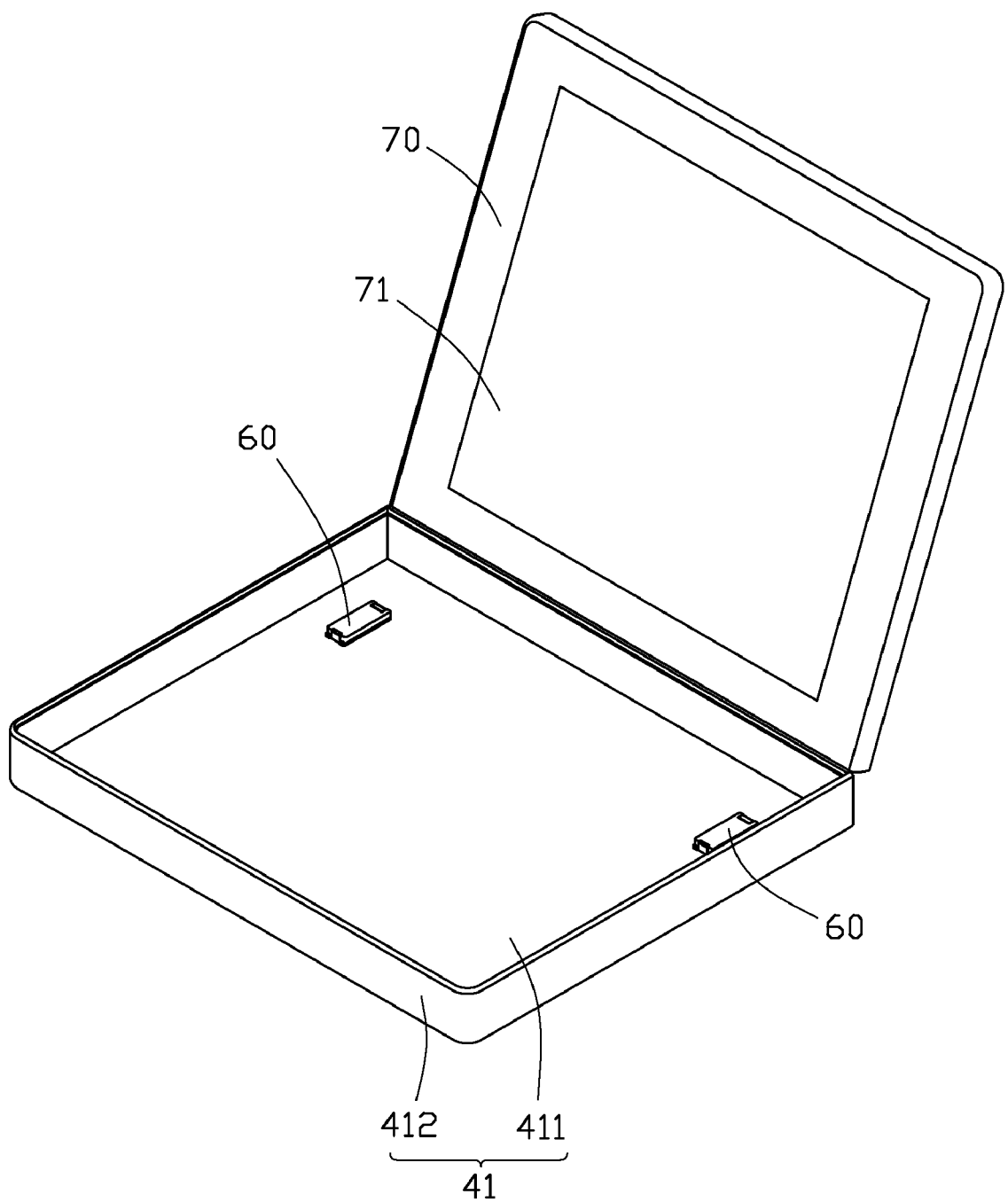
FIG. 2 is an isometric view of the notebook computer in FIG. 1, showing only the bottom housing and the display body.

Referring to FIGS. 1 and 2, a notebook computer 30 in accordance with an embodiment of the present invention is shown. The notebook computer 30 includes a main body 40 and a display body 70. The display body 70 is rotatably connected to the main body 40. The main body 40 includes a housing 41, a keyboard 42, two supporting mechanisms 60, and a plurality of electronic components (not shown). The keyboard 42 is assembled on the top of the housing 41. The supporting mechanisms 60 and the electronic components are disposed in the housing 41 below the keyboard 42. The display body 70 includes a display panel 71.

Figure 3:
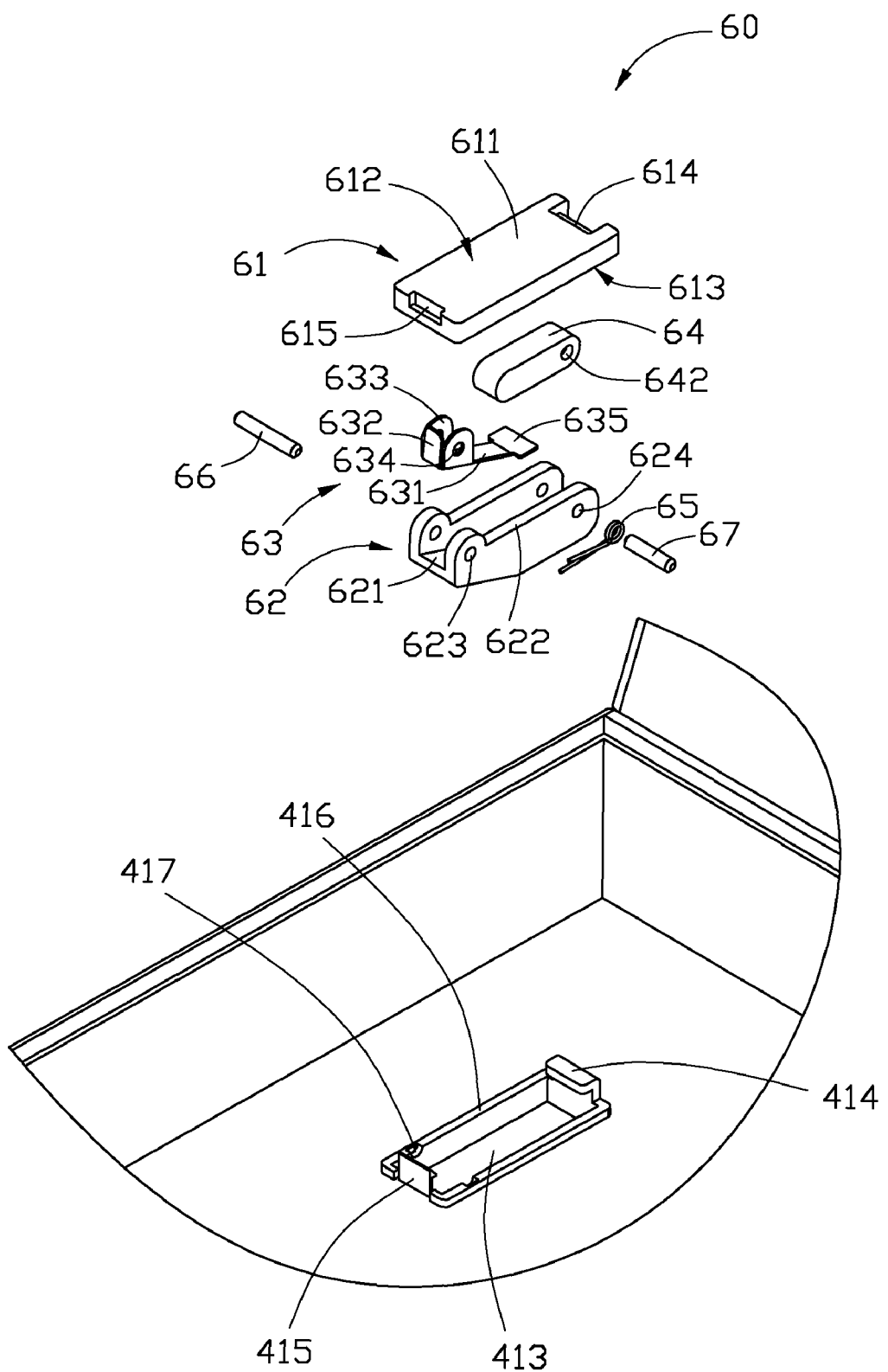
FIG. 3 is a part of an exploded, isometric view of the notebook computer in FIG. 2, showing the structure of a support mechanism.
Figure 7:
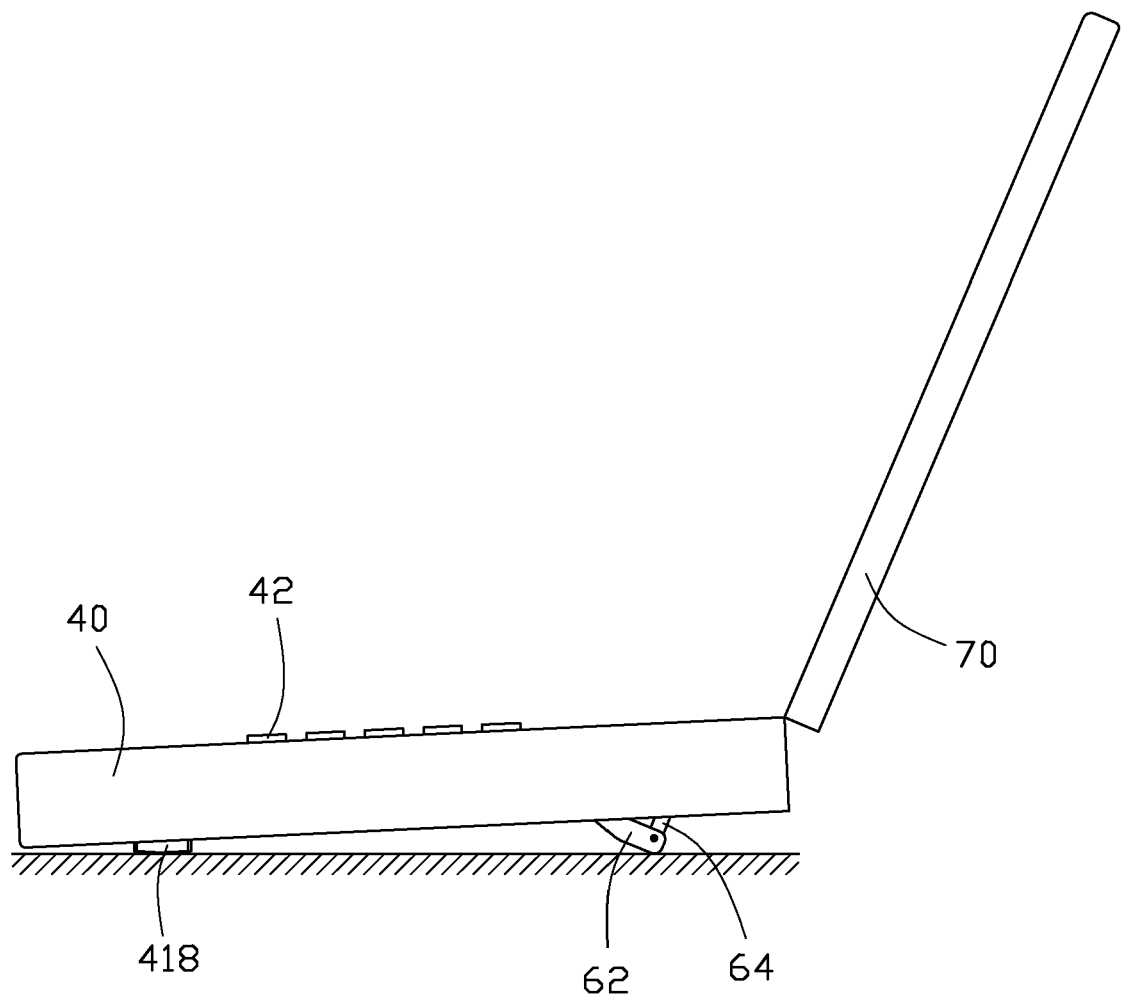
FIG. 7 is a side view of the notebook computer supported by the support legs of FIG. 2.
Figure 8:
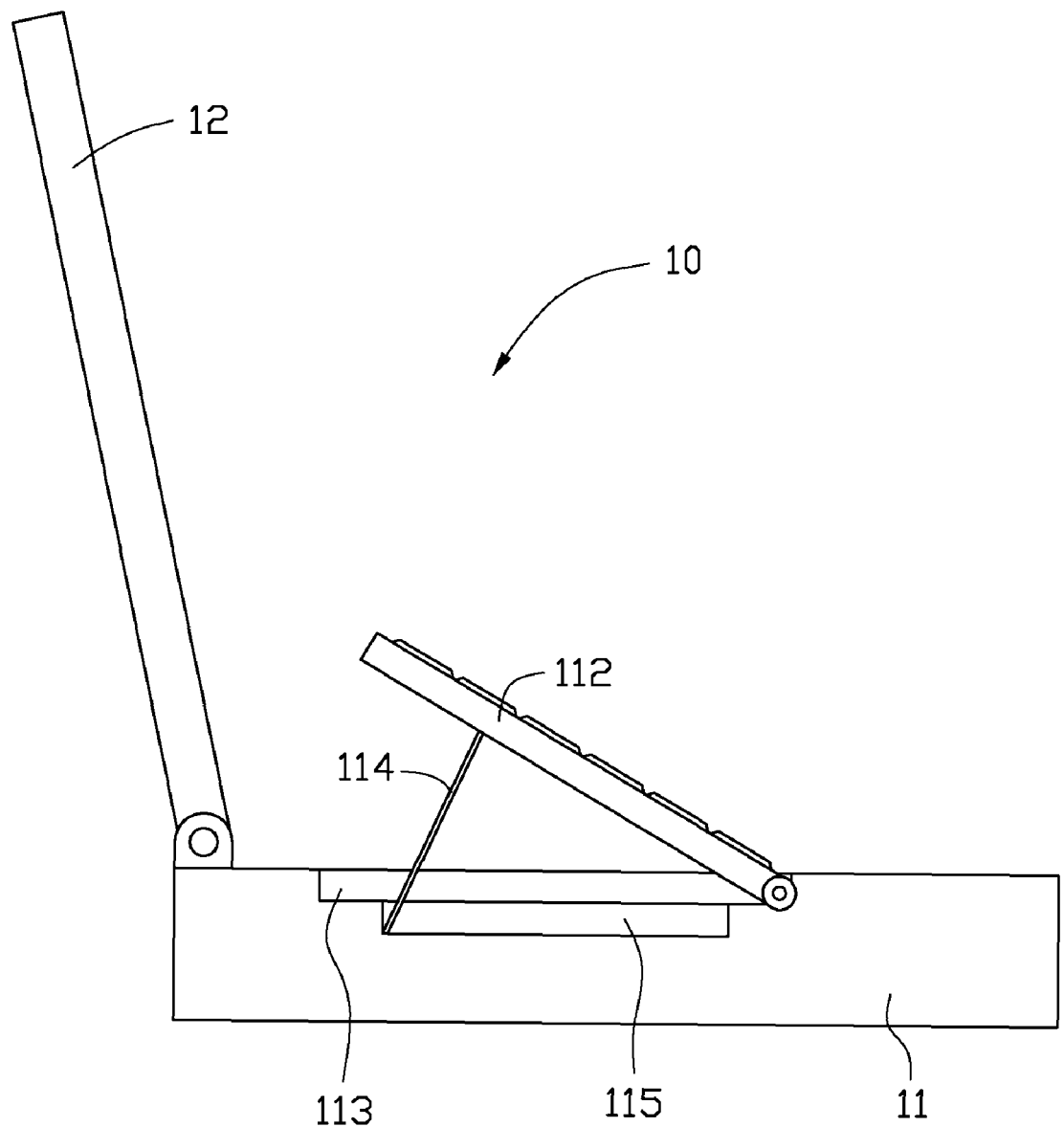
FIG. 8 is a side view of a conventional notebook computer.

The housing 41 includes a rectangular base plate 411 and four side plates 412. The side plates 412 substantially perpendicularly extend from the edges of the base plate 411. Referring to FIG. 3, the base plate 411 defines two rectangular through holes 413. The rectangular through holes 413 are aligned parallel to a connecting side between the housing 41 and the display body 70. A first limiting piece 414 and a second limiting piece 415 are formed at opposite ends of each through hole 4111. Two flanges 416 are formed on the sides of through hole 4111 between the first limiting piece 414 and second limiting piece 415 correspondingly. Each flange 416 defines an assembling groove 417 thereof. Two pads 418 (see FIG. 7) are formed aligned parallel to a side of the rectangular through hole 413 opposite to the connecting side.

Each supporting mechanism 60 includes a cover 61, a support leg 62, a resilient member 63, a positioning leg 64, a torsion spring 65, a first shaft 66, and a second shaft 67.

Figure 4:
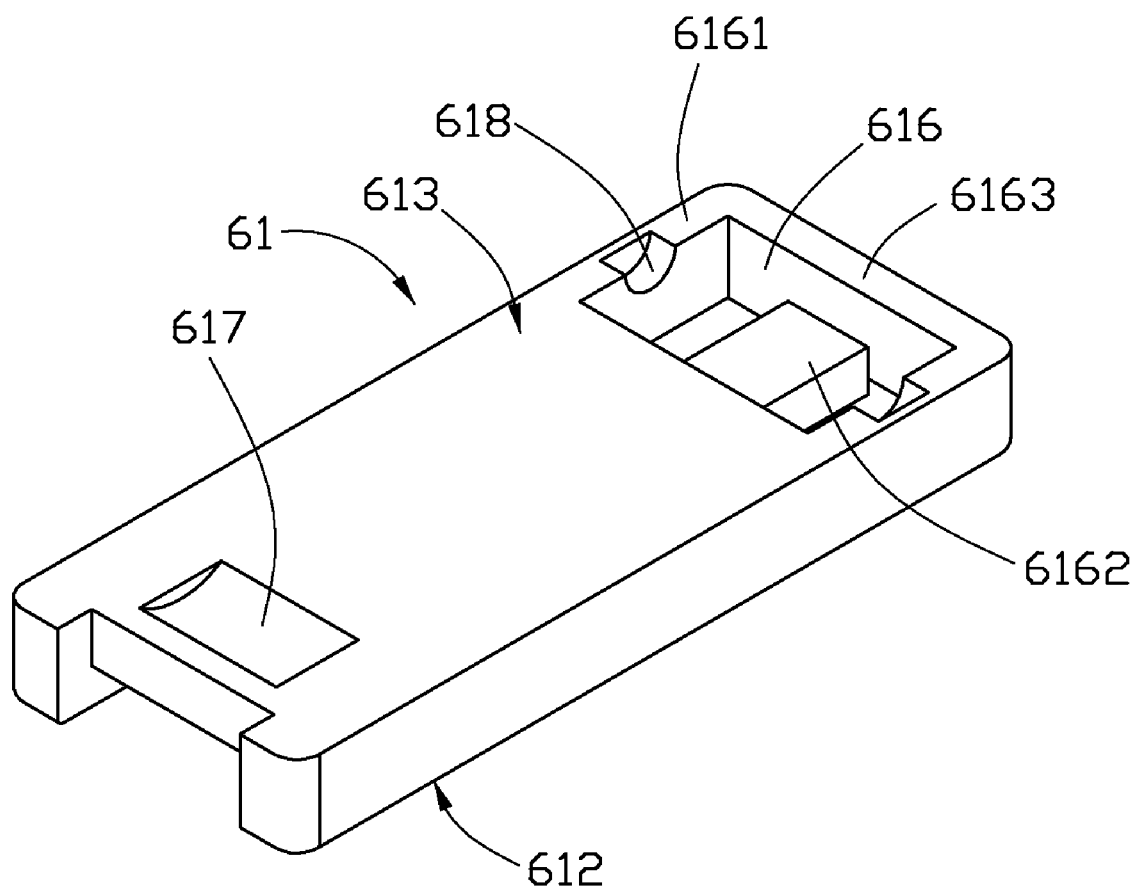
FIG. 4 is an isometric view of the cover in FIG. 3, viewed from a bottom-side up aspect.

The cover 61 includes a rectangular base portion 611. The base portion 611 includes a first surface 612 and a second surface 613 on another side of the base portion 611 opposite to the first surface 612. The cover 61 defines a first limiting groove 614 at an end of the first surface 612, and is configured for receiving the first limiting piece 414. The cover 61 also defines a second limiting groove 615 at another end of the first surface 612, and is configured for receiving the second limiting piece 415. Referring also to FIG. 4, the cover 61 defines an assembling groove 616 and a receiving groove 617 in opposite ends of the second surface 613. A cutout 618 is formed in each of the two first sidewalls 6161 of the assembling groove 616. A cuboid protrusion 6162 is formed in the bottom wall of the assembling groove 616.

The support leg 62 includes a main plate 621 and two side plates 622 extending from opposite sides of the main plate 621. Opposite ends of each side plate 622 defines a first pivot hole 623 and a second pivot hole 624 correspondingly.

The resilient member 63 includes a main portion 631, a positioning piece 632, two connecting pieces 633, and a fixing piece 635. The positioning piece 632 and the fixing piece 635 extend from opposite ends of the main portion 631 respectively. The positioning piece 632 is configured for engaging between the protrusion 6162 and a second sidewall 6163 defining the assembling groove 616. The fixing piece 635 is fixed to the support leg 62 between two side plates 622. The connecting pieces 633 are formed on opposite sides of the main portion 631 correspondingly. Each connecting piece 632 defines a through hole 634.

Figure 5:
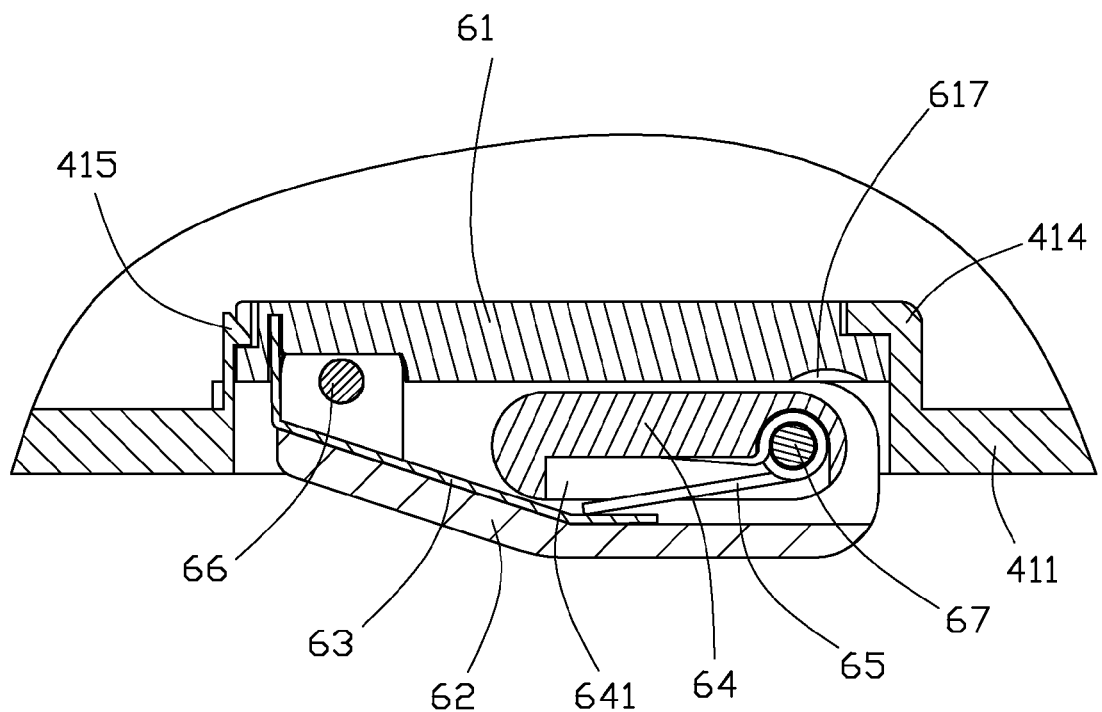
FIG. 5 is a part of an isometric, cross-sectional view of the notebook computer of FIG. 2, with a support leg received to the housing.

Referring to FIGS. 3 and 5, the positioning leg 64 is an elongated pole in shape, and defines a groove 641 therein. Each side wall defining the groove 641 defines a pivot hole 642 communicating with the groove 641. Both the first shaft 66 and the second shaft 67 are cylindrical shafts.

Figure 6:
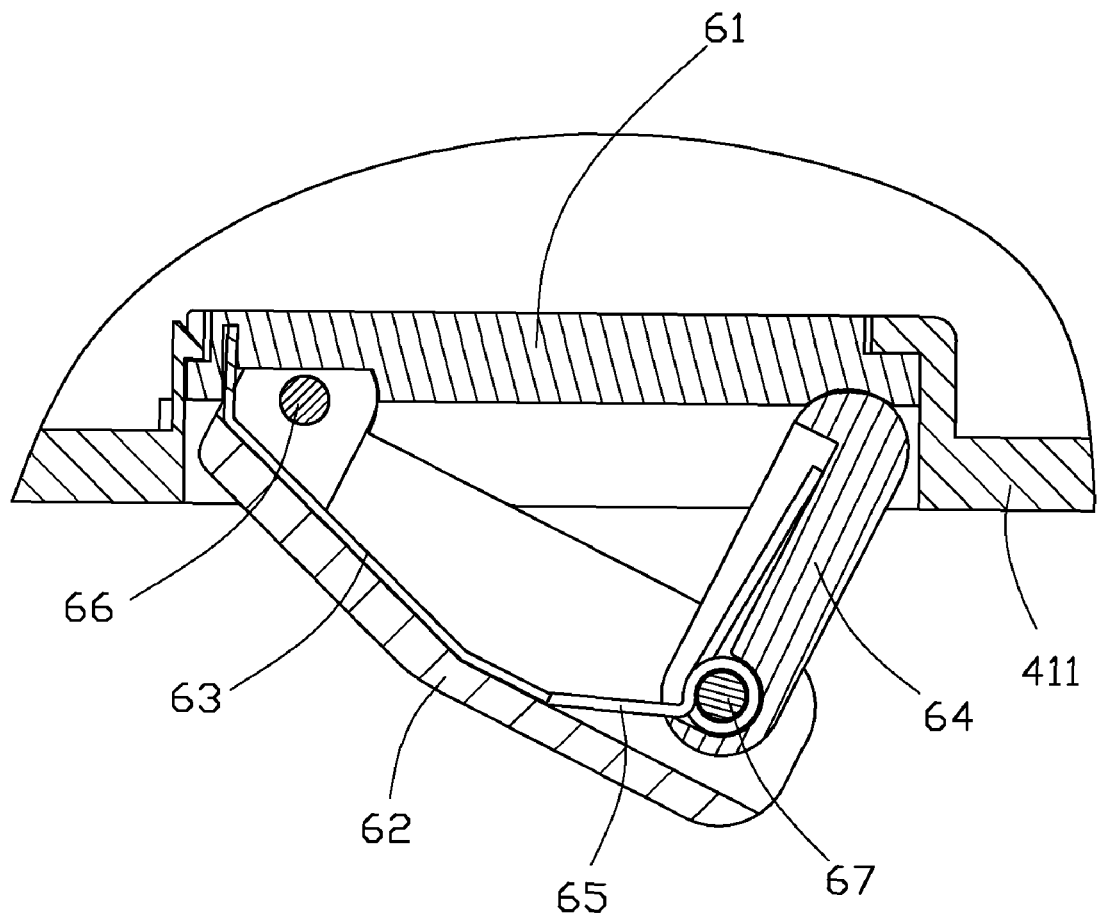
FIG. 6 is a partial isometric, cross-sectional view of the notebook computer of FIG. 2, with the support leg in use.

Referring to FIGS. 2 through 7, in a process of assembling one supporting mechanism 60 to the housing 41, the resilient member 63 is disposed between the side plates 622 of the support leg 62, and touches with the main plate 621. The first shaft 66 extends in the one side plate 622 of the support leg 62, one connecting pieces 632 of the resilient member 63, the other side plate 622 of the support leg 62, and the other connecting pieces 632 of the resilient member 63. Ends of the first shaft 66 are received in the assembling grooves 417 of the base plate 411 correspondingly. The cover 61 is disposed above the through hole 413 of the base plate 411, with the first limiting piece 414 engaging with the first limiting groove 614 of the cover 61, and the second limiting piece 415 engaging with the second limiting groove 615. Then, the positioning piece 632 engages between the protrusion 6162 and a second sidewall 6163 defining the assembling groove 616, thus producing a resilient force to push the support leg 62 towards the base plate 411. The torsion spring 65 is disposed in the groove 641 of the positioning leg 64. The second shaft 67 extends through the support leg 62, the torsion spring 65, and the positioning leg 64, thus rotatably connecting the positioning leg 64 to an end of the support leg 62. The positioning leg 64 is rotated towards the support leg 62, and the torsion spring 65 becomes compressed between the support leg 62 and the positioning leg 64, thus producing a torsion force that drives the positioning leg 64 away from the support leg 62. Because the resilient force pushing the support leg 62 to the base plate 411 is larger than the torsion force driving the positioning leg 64 away from the positioning leg 64, the positioning leg 64 is compressed between the cover 61 and the support leg 62 (as shown in FIG. 6). The other supporting mechanism 60 is assembled to another part of the housing 41, according to the above-described assembling steps.

In use, the support leg 62 is driven to rotate relative to the first shaft 66 away from the base plate 411 by an external force. After that, the positioning leg 64 is driven to rotate relative to the second shaft 67 away from the support leg 62 by the torsion force of the torsion spring 65. When the positioning leg 64 engages with the receiving groove 617 of the cover 61, the external force is released. As such, the support leg 62 becomes supported by the positioning leg 64, and the notebook computer 30 becomes tilted upward from the supporting surface by the support leg 62. When the notebook computer 30 does not need to be supported by the support legs 62, the external force is applied on the positioning leg 64, in order to drive the positioning leg 64 to rotate relative to the support leg 62. After that, the support leg 62 rotates to the base plate 411 via the resilient force of the resilient member 63.

Because the notebook computer 30 can be tilted away from a desktop via the supporting mechanisms 60, operating the keyboard 42 of the main body 40 would be more comfortable. Furthermore, heat can be dispersed from a bottom of the main body 40, thus heat generated by the electronic components can be dispersed more efficiently. In addition, when the notebook computer 30 needs to be supported by the support legs 62, the support leg 62 only needs to be pushed, and the positioning leg 64 will rotate automatically to support the support leg 62. Accordingly, the notebook computer 30 is convenient for use.

In an alternative embodiment, the supporting mechanism 60 does not include the resilient member 63, and the support leg 62 can engage with the base plate 411. The positioning leg 64 is rotatably connected to the support leg 62, and the torsion spring 65 is resisted between the support leg 62 and the positioning leg 64.

It should be understood that, the notebook computer 30 may include one single supporting mechanism 60. In that case, the supporting mechanism 60 is preferably disposed on the middle of one side of the main body 40. The notebook computer 30 may include three or more supporting mechanisms 60. Furthermore, the resilient member 63 and the torsion spring 65 can be replaced by other elastic members. The supporting mechanism 60 may not include the cover 61, and the resilient member 63 engages with the housing 41 to produce the resilient force. In addition, the supporting mechanisms 60 can also be formed on other electronic devices, such as Personal Digital Assistant (PDA).

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electronic device, comprising:
    a main body;
    at least one supporting mechanism mounted on the main body, the at least one supporting mechanism comprising:
        a support leg being rotatably connected to the main body, configured for supporting the main body;
        a positioning leg configured for supporting the support leg;
        a shaft, the shaft extending through the support leg and the positioning leg, thus rotatably connecting the positioning leg to the support leg, and
        a first elastic member resisted between the support leg and the positioning leg, thus producing an elastic force to drive the positioning leg away from the support leg.

2. The electronic device as claimed in claim 1, wherein the at least one supporting mechanism further comprises a second elastic member disposed between the support leg and the main body to produce an elastic force to drive the support leg to rotate to the main body.

3. The electronic device as claimed in claim 2, wherein the main body comprises a housing, the housing comprises a base plate and a plurality of side plates, the side plates are substantially perpendicularly extending from an edge of the base plate.

4. The electronic device as claimed in claim 3, wherein the base plate defines at least one through hole, two flanges are formed on opposite sides of the at least one through hole, each flange defines an assembling groove thereof, the at least one supporting mechanism further comprises a first shaft, the first shaft extends through the support leg, and two ends of the first shaft are received in the assembling grooves of the flanges respectively.

5. The electronic device as claimed in claim 4, wherein the at least one supporting mechanism further comprises a cover, the cover is fixed to the base plate and opposite to the support leg.

6. The electronic device as claimed in claim 5, wherein the cover defines a receiving groove in a surface opposite to the support leg, and the receiving groove is configured for receiving an end of the positioning leg.

7. The electronic device as claimed in claim 6, wherein the cover further defines a first limiting groove and a second limiting groove on opposite ends thereof, a first limiting piece and a second limiting piece are formed at opposite ends of the at least one through hole of the base plate respectively, the first limiting piece engages with the first limiting groove of the cover, and the second limiting piece engages with the second limiting groove of the cover.

8. The electronic device as claimed in claim 1, wherein the first elastic member is a torsion spring sleeved on the second shaft.

9. The electronic device as claimed in claim 1 being a notebook computer.

10. An electronic device, comprising:
a main body;
a display body rotatably connected to the main body;
at least one supporting mechanism comprising:
    a support leg being rotatably connected to the main body, configured for supporting the main body;
    a positioning leg being rotatably connected to the support leg, configured for supporting the support leg; and
    a resilient member disposed between the support leg and the main body, to produce a resilient force to drive the support leg rotating to the main body.

11. The electronic device as claimed in claim 10, wherein the main body comprises a housing, the housing comprises a base plate and a plurality of side plates, the side plates are substantially perpendicularly extending from an edge of the base plate.

12. The electronic device as claimed in claim 11, wherein the base plate defines at least one through hole, two flanges are formed on opposite sides of the at least one through hole, each flange defines an assembling groove thereof, the at least one supporting mechanism further comprises a first shaft, the first shaft extends through the support leg, and two ends of the first shaft are received in the assembling grooves of the flanges respectively.

13. The electronic device as claimed in claim 12, wherein the at least one supporting mechanism further comprises a cover, the cover is fixed to the base plate and opposite to the support leg.

14. The electronic device as claimed in claim 13, wherein the cover defines a receiving groove in a surface opposite to the support leg, and the receiving groove is configured for receiving an end of the positioning leg.

15. The electronic device as claimed in claim 14, wherein the cover further defines a first limiting groove and a second limiting groove on opposite ends thereof, a first limiting piece and a second limiting piece are formed at opposite ends of the at least one through hole respectively, the first limiting piece engages with the first limiting groove of the cover, and the second limiting piece engages with the second limiting groove of the cover.

16. The electronic device as claimed in claim 10, wherein the at least one supporting mechanism further comprises a second shaft, the second shaft extends through the support leg and the positioning leg, thus the positioning leg is rotatably connected to the support leg.

17. The electronic device as claimed in claim 10 being a notebook computer.

* * * * *